United States Patent [19]
Hamblen

[11] Patent Number: 5,629,800
[45] Date of Patent: *May 13, 1997

[54] GRADIAL ZONE LENS AND METHOD OF FABRICATION

[75] Inventor: David P. Hamblen, Rochester, N.Y.

[73] Assignee: Eastman Kodak Company, Rochester, N.Y.

[*] Notice: The term of this patent shall not extend beyond the expiration date of Pat. No. 5,486,951.

[21] Appl. No.: 464,487

[22] Filed: Jun. 5, 1995

Related U.S. Application Data

[63] Continuation of Ser. No. 169,839, Dec. 16, 1993, Pat. No. 5,486,951.

[51] Int. Cl.$^6$ .............. G02B 5/18; G02B 27/44; B29D 11/00
[52] U.S. Cl. .............. 359/565; 359/566; 359/570; 264/1.32; 264/1.7; 264/2.1
[58] Field of Search .............. 359/565, 566, 359/569, 570, 571, 742; 264/1.31, 1.32, 1.33, 1.7, 2.1

[56] References Cited

U.S. PATENT DOCUMENTS

| | | |
|---|---|---|
| 3,614,197 | 10/1971 | Nishizawa et al. |
| 3,626,194 | 12/1971 | Hirano et al. |
| 3,653,742 | 4/1972 | Buchan. |
| 3,718,383 | 2/1973 | Moore. |
| 3,823,995 | 7/1974 | Carpenter. |
| 4,022,855 | 5/1977 | Hamblen. |
| 4,195,620 | 4/1980 | Rust. |
| 4,668,053 | 5/1987 | Nishi et al. |
| 4,674,843 | 6/1987 | Baba et al. |
| 4,693,565 | 9/1987 | Ichikawa et al. |
| 5,044,706 | 9/1991 | Chen .............. 359/565 |
| 5,109,298 | 4/1992 | Nishi. |
| 5,144,484 | 9/1992 | Southwell. |
| 5,152,787 | 10/1992 | Hamblen. |
| 5,182,672 | 1/1993 | Mukai et al. |
| 5,244,371 | 9/1993 | Bello et al. |
| 5,257,132 | 10/1993 | Ceglio. |
| 5,486,951 | 1/1996 | Hamblen .............. 359/566 |

FOREIGN PATENT DOCUMENTS

| | | |
|---|---|---|
| 3726042 | 2/1989 | Germany. |
| 3818762 | 12/1989 | Germany. |
| 4214259 | 7/1993 | Germany. |
| 6547/72 | 8/1972 | Japan. |
| 109456/79 | 8/1979 | Japan. |
| 191002 | 10/1984 | Japan. |
| 203909/85 | 10/1985 | Japan. |
| 253930/60 | 12/1985 | Japan. |
| 48808/86 | 3/1986 | Japan. |
| 254923/86 | 11/1986 | Japan. |
| 244002/63 | 11/1988 | Japan. |

OTHER PUBLICATIONS

*Phototonics Spectra*, Sep. 1992, pp. 125–132, Alan Kathman and Eric Johnson, "Binary Optics: New Diffractive Elements for the Designer's Tool Kit".

*Lasers & Optronics*, Jul. 1991, pp. 47–51, Dr. Marcus Noble, "Diffractive Optics: Growth Technology for the 1990s".

*Phototonics Spectra*, Nov. 1991, pp. 205–208, Dean Faklis & G.M. Morris, "Optical Design with Diffractive Lenses".

*Laser Focus World*, Aug. 1989, pp. 47, 51, "Binary Optics Offers new Freedom to System Designers".

*Optics & Phototonics News*, May 1991, pp. 20–22, Michael Farn, Margaret B. Stern, and Wilfrid Veldkamp, "The Making of Binary Optics".

*Scientific American*, Jun. 1991, p. 32, "double Vision", Russell Ruthen.

*Phototonics Spectra*, Dec. 1991, pp. 131–134, Dean Faklis & G. M. Morris, "Diffractive Lenses in Broadband Optical System Design".

Primary Examiner—Jon W. Henry
Attorney, Agent, or Firm—Clyde E. Bailey, Sr.; Leonard W. Treash, Jr.

[57] ABSTRACT

Diffractive lenses having gradial zones (62, 70, 78, 90, 98, 106, 114) are formed by separately, sequentially spin casting and polymerizing successive radial zones of the lens to produce optical phase differences of $2\pi$ between adjacent gradial zones. Diffractive lenses may be molded in plano-plano(60), plano-concave (68) and plano-convex (76) geometries and also may be combined with conventional plano-plano (84), convex-convex (92), plano-concave (100) and plano-convex (108) refractive lenses.

18 Claims, 4 Drawing Sheets

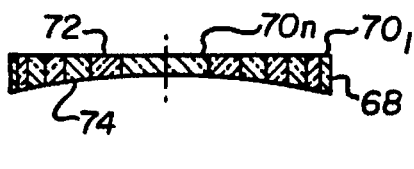
FIG. 5
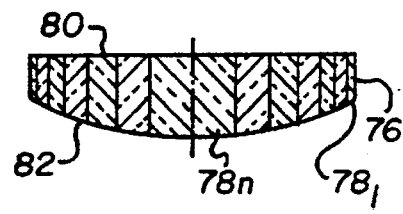
FIG. 6
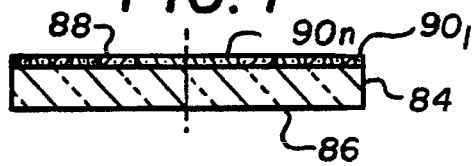
FIG. 7
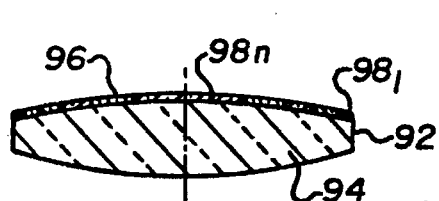
FIG. 8
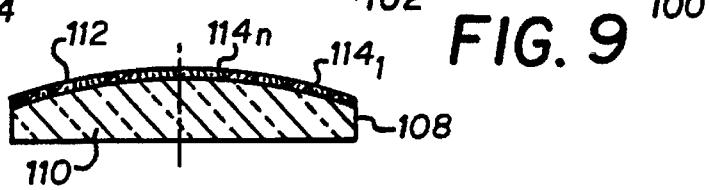
FIG. 9
FIG. 10

GRADIAL ZONE LENS AND METHOD OF FABRICATION

This is a continuation of U.S. application Ser. No. 169,839, filed 16 Dec. 1993, now U.S. Pat. No. 5,486,951.

DESCRIPTION

1. Technical Field

The invention concerns lenses and methods for making lenses. More particularly, the invention relates to lenses or groups of lenses having not only plano or conventional curved refractive surfaces, but also an internal or attached diffractive element.

2. Background Art

The relatively new field of diffractive optics has yielded applications in infrared cameras, endoscopes, intraocular lenses, ultraviolet sensors, microlens arrays and printer scanning lenses. These lenses exhibit improved performance over optical systems that utilize only refractive or reflective surfaces. As a consequence, sometimes the number of lens elements can be reduced, thereby providing savings in weight and manufacturing cost.

Diffractive optics employs a surface relief pattern of wavelength dimensions to control the wavefront distribution in much the same manner as a diffraction grating. Methods for depositing such surface reliefs are by photo lithography (referred to as binary optics), diamond turning, laser machining or holographic techniques. Diffractive zones are usually deposited as thin substrates onto planar surfaces in concentric patterns. Individual zonal minutiae have structural dimensions of tens of microns, appearing sometimes as a series of discrete steps, in order to give high diffraction efficiency.

Such known types of diffractive elements require the use of complex, expensive equipment for their manufacture and are difficult to make. Moreover, the known photolithographic manufacturing processes require that the diffractive elements be provided on flat surfaces, particularly for binary optics, which limits their application. Also, the known diamond turning processes, to be used on previously formed lenses, require precision fixturing to secure the existing lens during turning.

SUMMARY OF THE INVENTION

The invention is defined by the appended claims. However, one embodiment comprises concentric cylindrical layers of one or more transparent materials that are individually spin cast and at least partially cured in a disk shaped mold with flat, curved or a combination of flat and curved surfaces. A suitable apparatus for making such lenses is disclosed in commonly assigned U.S. Pat. No. 5,244,371. Each layer of material is cured before a micro liter volume for the next layer is injected into the mold. Successive layers should have essentially equal cross sectional areas, as measured in a plane normal to the axis of the lens. Successive concentric layers may be formed from materials which, when cured, have different indices of refraction to give a phase difference or wavelength retardation opposite that of an adjacent layer. Alternatively, the successive concentric layers may be formed from the same materials, the curing of each ring before formation of the next apparently being effective to produce differences in optical properties from layer to layer which produce a similar phase difference or wavelength retardation. As a result, a flat disk lens of this type can provide a focus much like a refractive lens. When used as an addendum to a curved surface, the diffractive layer can act to correct inherent lens aberrations. Preferably, the materials used are monomers which are photopolymerizable in the ultraviolet range; however, those skilled in the optical arts will appreciate that other spin castable materials also may be used in accordance with the invention, such as those which cure in response to microwave radiation, other radiation outside the ultraviolet range, induction heating or laser heating.

In addition to placing a surface pattern of such concentric layers onto a plano or a curved surface, the method of the invention may be used to provide a diffractive component within the bulk of the lens. That is, a plano-convex or a plano-concave lens can be spin cast to produce such concentric layers extending completely through the thickness of the lens. The gradial zones of the lens then appear as a series of concentric cylinders in cross section. Since the zones are successively built up in a mold and have constant cross sectional areas, the concentric cylinders are formed radially outward from the central axis of the lens. The zones appear as very thin cylinders of increasing radial width as measured from the perimeter to the axis of the lens, having somewhat the same visual appearance as a Fresnel zone plate. Since the zones have micron dimensions, they interact with incident light in much the same manner as a surface diffractive grating. In it simplest form, the gradial zone lens may be a flat disk without convex or concave surfaces. However, when the gradial zone lens is augmented with a plano-convex or plano-concave surface or is used as an addendum to a curved surface lens, the gradial zone portion of the lens system improves focusing.

The method of my invention is particularly suited for making a diffractive lens. A mold is provided having an axis and a mold cavity symmetrically surrounding the axis, the cavity having a desired geometry for at least one exterior surface of the diffractive lens. The mold is spun about the axis and a first volume of optically transparent material is injected into the cavity during the spinning, thereby placing the first volume at a periphery of the cavity to define a radially outer zone of the diffractive lens. The first volume is cured within the outer zone to at least partially solidify the material. A second volume of optically transparent material is injected into the cavity during the spinning, thereby placing the second volume against an inner periphery of the outer zone to define a first radially inner zone of the diffractive lens. The second volume is cured within the first inner zone to at least partially solidify the material. The injecting and curing steps are then repeated to define and cure subsequent inner zones of the diffractive lens until the mold cavity is filled with concentric zones of cured material. The material may be a polymer and the curing may be achieved by subjecting the volumes of polymer to radiation to polymerize the monomer. The index of refraction of the cured material may be different in adjacent zones of the diffractive lens. The cross sectional area of each zone preferably is essentially equal for all zones of the diffractive lens. The same material may be injected to define adjacent zones of the diffractive lens. Alternatively, two materials may be injected alternately to define alternate zones of the diffractive lens. The mold cavity may shaped to provide a plano-plano diffractive lens, a plano-convex diffractive lens or a plano-concave diffractive lens. A previously made refractive lens may be placed in the mold cavity coaxially with the axis of the mold, whereby the zones of the diffractive lens are applied as a layer to a surface of the refractive lens. The previously made refractive lens may be a plano-plano, a convex-convex, a plano-concave or a plano-convex lens.

A diffractive lens in accordance with my invention comprises a plurality of concentric annular zones of cured material, the zones extending through the bulk of the lens from a radially innermost zone to a radially outermost zone and the material of each zone having been spin molded and cured before the material of an adjacent, inner zone. The cross sectional areas of the zones may be chosen to produce an optical phase difference between adjacent zones of $2\pi$. The index of refraction of the cured material may be the same or different in adjacent zones of the diffractive lens. The cured material may be a polymer produced from a monomer polymerized by radiation. The bulk diffractive lens may be a plano-plano, plano-convex or plano-concave lens. A refractive lens may be provided with the diffractive lens applied coaxially as a layer to a surface of the refractive lens. Such a refractive lens may be a plano-plano, a convex-convex, a plano-convex or a plano-concave lens with the diffractive lens is applied to the concave surface.

Gradial zone diffractive lenses according to my invention provide several advantages over known types of diffractive lenses. Because the surface of a gradial zone lens is free of geometric features, contamination by ambient dust is minimized; whereas, dust collects readily on the free relief structures of prior art diffractive lenses. The gradial zone lenses are compact and light in weight. Great flexibility in lens design is possible for material selection and lens size. A wide range of wavelengths can be focused using gradial zone lenses, from the visible to near infrared and ultraviolet. Gradial zone lenses can be made more rapidly than conventional diffractive lenses. Both refractive and diffractive elements can be combined in a single unit without additional processing.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 5 shows a sectional view through a plano-concave bulk diffractive lens in accordance with the invention.

FIG. 6 shows a sectional view through a plano-convex bulk diffractive lens in accordance with the invention.

FIG. 7 shows a sectional view through a plano-plano refractive lens having on one surface a diffractive layer in accordance with the invention.

FIG. 8 shows a sectional view through a convex-convex refractive lens having on one surface a diffractive layer in accordance with the invention.

FIG. 9 shows a sectional view through a plano-concave refractive lens having on its concave surface a diffractive layer in accordance with the invention.

FIG. 10 shows a sectional view through a plano-convex refractive lens having on its convex surface a diffractive layer in accordance with the invention.

DESCRIPTION OF THE PREFERRED EMBODIMENTS

Figure 1:
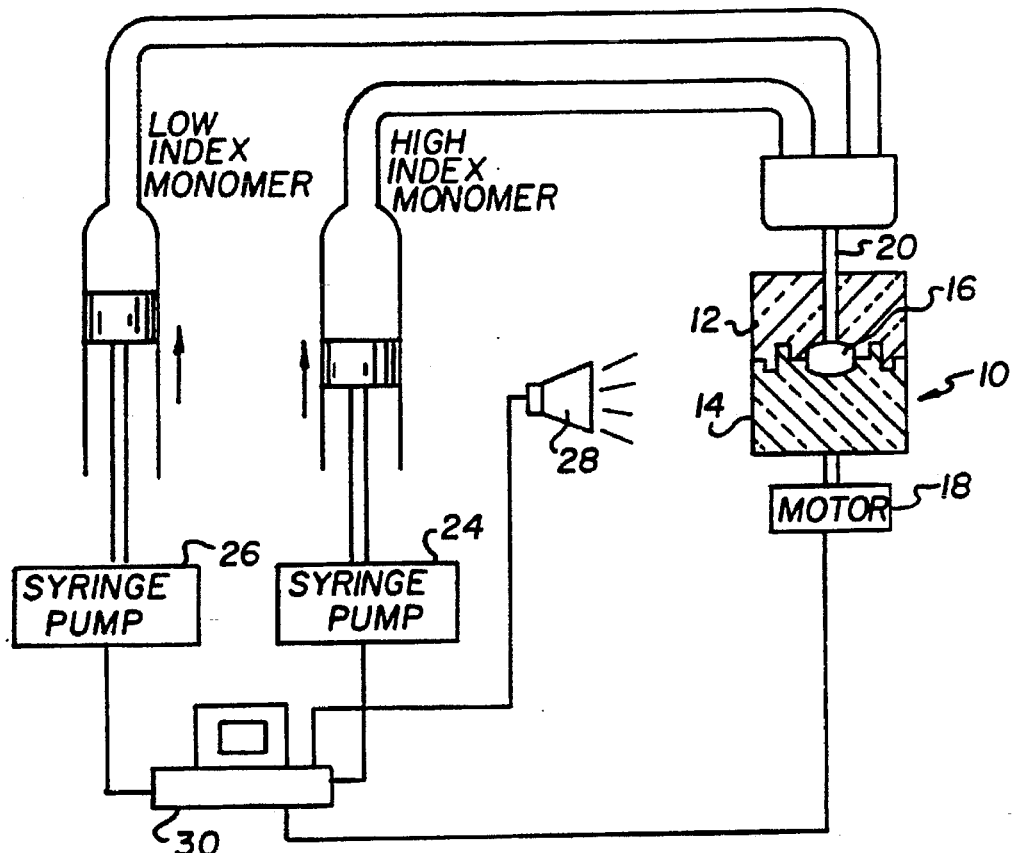
FIG. 1 shows a schematic block diagram of a spin molding apparatus which can be used to produce lenses in accordance with the invention.

The following is a detailed description of the preferred embodiments of the invention, reference being made to the drawings in which the same reference numerals identify the same elements of structure in each of the several Figures.

A spin molding or casting apparatus 10 suitable for making lenses in accordance with the invention is illustrated in FIG. 1. Apparatus 10 comprises upper and lower mold inserts 12, 14 which define a central cavity 16 shaped in the form of the lens to be made. Thus, cavity 16 may be shaped to produce a flat disk plano-plano, a plano-convex or a plano-concave lens. The cylindrical axis of the spin mold becomes the center of symmetry or the optical axis of the finished lens. Optically transparent materials such as premixed monomers, or a single monomer, are injected on axis, through a sprue opening in upper mold insert 12 as the mold is rotated. The material of inserts 12, 14 is chosen to be transparent to the radiation or other energy which will be used to cure or photo polymerize the injected materials or monomers. Silicone rubber, for example, may be used for ultraviolet radiation. The flow of the materials is precisely controlled to inject the appropriate volume of material to provide equal cross sectional areas for each gradial zone. For a plano-plano lens, though, the volumes of all the zones would be essentially equal. Individual material volumes are in the order of 1 to 4 micro liters, for example, for plano-plano lenses having a diameter of about 12 mm and a thickness of about 4 mm. After each gradial zone has been injected, upper and lower mold inserts 12, 14 are irradiated or subjected to other energy to cause polymerizing or curing.

A motor 18, such as a spinner motor from Headway Research, Inc., capable of speeds in the range of 2,000 to 10,000 rpm, is coupled to spin molding apparatus 10. A hypodermic needle injector 20, such as a 22 gauge needle from Hamilton Corp., extends into the cavity defined by inserts 12, 14 and is coupled to a pair of syringe-type step pumps 24, 26, such as 13,333 step lead screw pumps from Cavro Scientific Corp. Where monomer materials are used, a source 28 of ultraviolet radiation, such as a 1,000 watt lamp from Oriel Corp., is positioned near apparatus 10 to apply radiation to polymerize the successive gradial zones. A conventional computer control unit 30 is operatively connected to motor 18, pumps 24, 26 and radiation source 28 to control the apparatus. Complete radiation hardening is not required before the lens is removed from the mold. Finish hardening by post baking may be done in an oven ramped to 115° C. over a two hour period, followed by a thermal soak for another two hours. The oven temperature is permitted to cool to ambient after the two hour soak.

Figure 2:
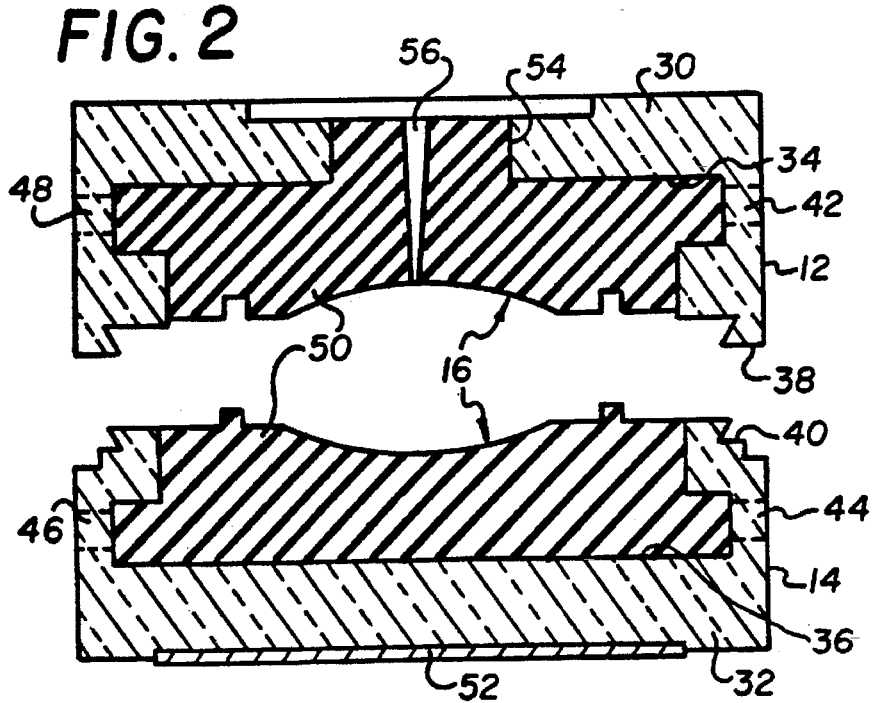
FIG. 2 shows an exploded sectional view of a mold suitable for use in accordance with the invention.

FIG. 2 illustrates a type of mold suitable for spin casting or molding in accordance with my invention. Upper mold insert 12 and lower mold insert 14 are formed from essentially mirror image bodies 30, 32 of a transparent plastic such as Lexan which are provided with interior volumes 34, 36. Bodies 30, 32 can be snapped together using conventional joint pairs 38, 40; so that interior volumes 34, 36 face into one another. A glass blank or core having optical quality surfaces and the geometry of the desired mold cavity 16 and also having flanges to define the geometry for the parting line between the mold halves (not illustrated) is positioned suitably within the interior volumes. Typically, mold cavity 16 will have circular cylindrical side walls surrounding the rotational axis and flat, convex or concave end walls transverse to the rotational axis. Then, a material which is transparent to the radiation or energy to be used to cure the lens, such as silicone robber 50, is pumped into volumes 34, 36 through peripheral ports 42, 44, 46, 48. A further core element, not illustrated, is positioned in a bore 54 to define a septum 56 for injector 20. Optionally, a metal plate 52 may be attached to the underside of body 32 to permit magnetic chucking of the mold. When material 50 has set, the mold inserts are separated and the cores are removed, leaving the illustrated structure. Those skilled in the art will appreciate that mold cavity 16 can be configured to produce lenses of the types illustrated in FIGS. 3 to 10, for example.

Centrifugal force holds each cylindrical layer outward from the axis of rotation; therefore, mold filling commences from the outer diameter of the mold and moves inward toward the axis of rotation. Individual injections of monomer, less than a second in duration for a lens of the size previously mentioned, spread outward from the central point of injection, forming concentric layers or zones having essentially equal cross sectional areas. After each injection of monomer has been spun outward, ultraviolet radiation is applied from source 28 for about a minute to at least partially cure that layer before the next injection. Since the volumes of the successive layers are on the order of a few microliters each, photopolymerization or curing of each layer is rapid. Injector 20 must impart some force to each injection, to prevent a droplet of monomer from suspending on the needle tip due to surface tension and not consistently entering the mold.

Suitable monomers and mixtures thereof may be selected from CR-39, a diallyl diglycol carbonate with $N_d=1.502$; and HIRI, a polycarbonate casting resin with $N_d=1.565$, both available from PPG Industries, Inc. These plastics are used extensively in the eyeglass industry and are especially suitable for the gradial lenses of my invention because of their optical durability. However, those skilled in the art will appreciate that a wide variety of materials can be used without departing from the scope of my invention. Four weight percent each of a photoactivator benzoyl-methyl ether and a thermal hardener benzoyl peroxide are premixed with each monomer. Ultraviolet exposure is generally sufficient to produce a hardened polymer plastic; but post baking by ramping an oven to 115° C., followed by soak at this temperature over a two hour period, anneals stress and completes polymerization. Shrinkage of the polymer is about 3 percent.

Figure 3:
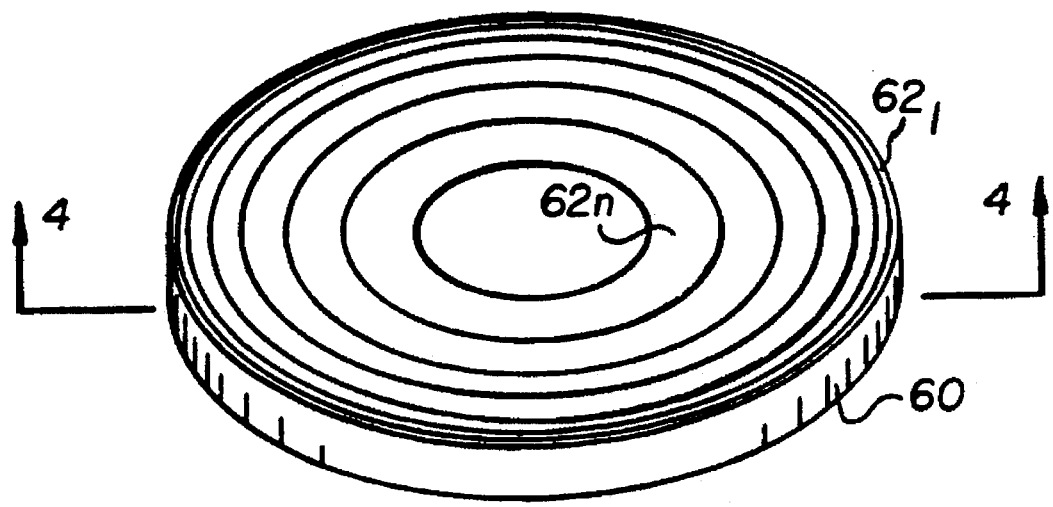
FIG. 3 shows a greatly enlarged perspective view of a plano-plano diffractive lens in accordance with the invention.
Figure 4:
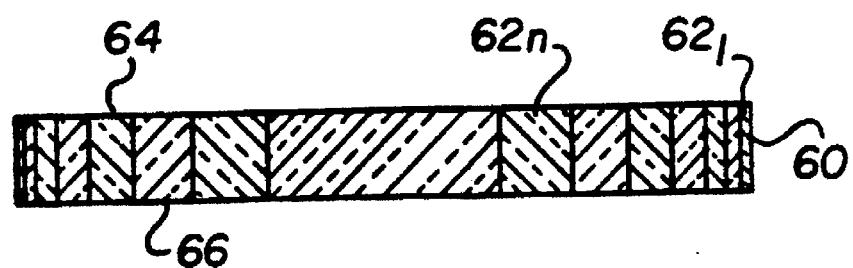
FIG. 4 shows a sectional view taken along line 4—4 of FIG. 3.

In the lenses of FIGS. 3 to 6, the diffractive layers extend through the entire bulk or thickness of the lens. A plano-plano lens 60 is shown in FIGS. 3 and 4 which comprises concentric layers $62_1$ to $62_n$ between plano surfaces 64, 66. Such a lens will focus light coming from either direction. FIG. 5 shows a plano-concave lens 68 which comprises concentric layers $70_1$ to $70_n$ between plano surface 72 and concave surface 74. Such a lens will focus light entering through plano surface 72. FIG. 6 shows a plano-convex lens 76 which comprises concentric layers $78_1$ to $78_n$ between plano surface 80 and convex surface 82. Such a lens will focus light entering through plano surface 80.

In the lenses of FIGS. 7 to 10, the diffractive layers extend through a thin layer applied to one surface of a previously made refractive lens which was positioned in mold cavity 16 before spin casting commenced. These lenses will focus light coming from either direction. FIG. 7 shows a previously prepared plano-plano refractive lens 84 which comprises a body 86 onto which a diffractive layer 88 has been spin molded, the layer comprising concentric layers $90_1$ to $90_n$. FIG. 8 shows a convex-convex refractive lens 92 which comprises a body 94 onto which a diffractive layer 96 has been spin molded, the layer comprising concentric layers $98_1$ to $98_n$. FIG. 9 shows a previously prepared plano-concave refractive lens 100 which comprises a body 102 onto which a diffractive layer 104 has been spin molded, the layer comprising concentric layers $106_1$ to $106_n$. FIG. 10 shows a previously prepared plano-convex lens 108 which comprises a body 110 onto which a diffractive layer 112 has been spin molded, the layer comprising concentric layers $114_1$ to $114_n$.

A gradial lens according to my invention has a visual appearance rather like that of a Fresnel zone plate. While a Fresnel zone plate has surface structure consisting of alternating transparent and opaque rings, the surfaces of the gradial lens of my invention preferably are smooth with concentric layers or zones extending between the front and back surfaces of the lens. Like other diffractive structures, the layers or zones of the gradial lens have widths on the order of microns. Through these zones incident light is diffracted to form a spherical wavefront by constructive interference, as also occurs with a surface grating. In effect, a gradial lens can be a flat, plano-plano disk which acts as a lens without curved surfaces. When constructed with a concave or convex surface in the manners previously described, there is a focusing effect combining both refraction and diffraction.

A small change in refractive index is established at an interface that separates adjacent diffractive zones or layers. The optical path length through either zone retards light by an amount Nt, where N is the; index of refraction for rays traversing a zone with an axial thickness t. For air there are $(N-1)t/\lambda_o$ extra waves, where $\lambda_o$ is the specific wavelength of incident light and $N=1$, the index for air. For one zone having index $N_1$ next to an adjacent zone having index $N_2$, there will be $(N_2-N_1)t/\lambda_o$ extra waves introduced between neighboring ray paths. The wave displacement between rays constitutes a certain number of constructive interference fringes $\Delta m$, given by:

$$\Delta m = (N_2 - N_1)t/\lambda_o \qquad \text{Eq. (1)}$$

For a conventional diffractive lens with a geometrically shaped surface, the surface relief height is altered or blazed until the optical phase difference reaches a value of $2\pi$, which is equivalent to an OPD of one wave. Similarly, the zones of a gradial lens in accordance with my invention provide a modulo of $2\pi$ phase change, in accordance with one embodiment, due to use of two different indices of refraction in alternating concentric layers. By setting $\Delta m=2\pi$, Eq. (1) can be rearranged to solve for the index value $N_2$ for a phase change of one wave, given by:

$$N_2 = (2\pi\lambda_o + N_1 t)/t \qquad \text{Eq. (2)}$$

However, such an index change is small and difficult to prepare when mixing monomers. For example, the change might be seen only in the third or fourth decimal place of the index. This situation is improved if even multiples of n wave changes $n\lambda_o$ are taken, which still preserves the phase relationship. For an axial zone thickness of $t_o$, Eq. (2) becomes:

$$N_2 = (2\pi n \lambda_o + N_1 t_o)/t_o \qquad \text{Eq. (3)}$$

For example, if the reference zone refractive index $N_1=1.5000$ and the thickness $t_o=4.0$ mm at $\lambda_o=0.6328$ nm, substitution into Eq. (2) gives $N_2=1.50099$. Preparing the second monomer will be facilitated if a value of $n=4$ is chosen, for example. Calculating the index change in Eq. (3) for $4\lambda_o$ gives $N_2=1.50397$. Alternating zones with indices $N_1=1.5000$ and $N_2=1.50397$ will preserve the desired optical phase difference.

If the paraxial focus at point P of the gradial lens is at a distance F measured on the axis of the lens, then the OPD or optical path difference from each concentric layer or zone to P is increased one half a wavelength further from P as zones progressively, radially further from the axis are considered. Successive radial distances of $s_1, s_2, s_3, \ldots, s_n$ will be at distances from P of $F+\lambda/2$, $F+2\lambda/2$, $F+3\lambda/2, \ldots$, $F+n\lambda/2$. All of the zones have essentially equal cross sectional areas; therefore, from trigonometric construction the inner radius $r_n$ of each zone is given by:

$$r_n = [nF\lambda_o + \frac{1}{4}(n\lambda_o)^2]^{1/2} \qquad \text{Eq. (4)}$$

But, since $F_n \gg \lambda_o$, the second order term in Eq. (4) is very small; and the focal length of the diffractive lens according to my invention is given by:

$$F_n = r_n^2/n\lambda_o \qquad (5)$$

Several diffractive lenses were cast as plano-plano disks in two part molds of the type illustrated in FIG. 2. A rather wide outer ring of homogeneous polymer was formed first. Then a number of concentric diffractive layers or zones were formed in accordance with my invention, followed by a rather wide central disk of homogeneous polymer. From 40 to 60 concentric zones were provided in the several lenses, the zones having volumes in the range of 3 μL to 5 μL per zone. The radial widths of the zones varied from 1 μm to 5 μm. After molding, the central disk was obstructed by applying a black material to prevent light rays from entering. The outer ring was also obstructed using an iris diaphragm. Thus, only light incident upon the concentric diffractive zones was permitted to pass through the lens.

A plano-plano lens having a 12.0 mm diameter and a 4.0 mm axial thickness had its primary focus measured between 33.0 and 35.0 mm. Shorter but less intense focal spots also occurred at distances of about 5.5, 7.5, 12 and 20 mm. When calculated on the basis of an on-axis, central disk volume of about 5 mL, the paraxial focal length would be 31.44 mm using Eq. (4) with n=1 and $\lambda_o=0.6328$ nm. A star sector target was focused rather well using such a lens.

As another verification of focus attributed only to diffracted light, illumination of a gradial lens was provided by laser light spreading through a 10 μm aperture, serving as a point source. By placing a diffractive lens according to the invention at several distances relative to the cone of incident light from the aperture, focus could be observed within the umbra and penumbra regions caused by the shadow of the obstruction on the central disk. Moving the gradial lens in relationship to its focal length caused a focal shift nearer or further from the back surface of the lens, similar to the focal shift one would experience using a convex, homogeneous lens under similar circumstances.

Diffractive lenses in which all zones were made from the CR-39 polymer gave the appearance of lenses in which the material changed from zone to zone. After each incremental injection of monomer and photopolymerization, distinct interfaces appeared between zones, just as in the case of lenses where two different monomers were used in alternate zones. As shown schematically in FIGS. 3 and 4, the zone interfaces were separated by thin septa $63_1 \ldots 63_{n-1}$ and acted similar to a radial grating in diffracting light.

In other experiments, combination lenses were molded from diffractive and refractive elements. A plano-convex refractive lens was inserted in one side of mold cavity 16 and provided on its convex surface with approximately 40 concentric zones in accordance with my invention. Alternatively, the concentric zones could be provided on the plano surface of the lens. A control lens with a radius of 10 mm also was molded. CR-39 polymer was used for both lenses. With parallel, monochromatic light illumination, the homogeneous control lens exhibited an expected focal length near 20 mm. However, the combination lens exhibited two distinct foci, indicative of both refractive and diffractive components, the latter being the shorter focal length. Measured spot sizes at full width of half maximum of the Gaussian spread showed the diffractive focus to be 40.5 mm, while the refractive focus measured at 72.5 mm.

Gradial lenses according to my invention showed several loci, similar to other diffractive lenses. This is similar to the phase relationship between adjacent zones, because there is a cross-phase relationship between odd-numbered zones. For example, weaker orders occur because of constructive interference between zonal combinations, such as 1 and 3, 1 and 5, 1 and 7, and so forth. Present day fabrication methods such as photolithography and diamond turning, minimize higher order contributions through fabrication techniques that optimize for a single order where m=1.

The gradial zone lens has low diffraction efficiency. This can be understood if the zonal construction is considered similar to a binary, two level design. For example, instead of a four level, stair stepped structure as found in some binary optics, a gradial lens may be considered to have two steps. According to G.J. Swanson, "Binary Optics Technology: The Theory and Design. of Multi-Level Diffractive Optical Elements", Tech. Rept. 854 (1991), MIT Lincoln Laboratory, Lexington, Mass., the diffraction efficiency $\eta^N_m$ of a multi-step binary optic may be expressed by:

$$\eta^N_m = [\{\sin(\pi(m-\lambda_o/\lambda))\}/\pi m \cdot \{\sin(\pi m/N)\}/\sin\{(m-\lambda_o/\lambda)\pi/N\}]^2, \qquad \text{Eq. (6)}$$

where:

N=the number of multi-step levels;

m=the diffraction order number; and $\lambda_o$=the central wavelength.

For the special case where m=1, N=2 and monochromatic light causes $\lambda_o=\lambda$, Eq. (6) reduces to:

$$\eta^N_1 = [\{N\sin(\pi/N)\}/\pi]^2. \qquad \text{Eq. (7)}$$

For a gradial zone lens, substitution into Eq. (6) indicates that the efficiency is about 40.5%.

It would be possible to increase the diffraction efficiency of the gradial zone lens if each zone were subdivided into n-numbered subzones, each having an incremental change in index of refraction. By rewriting Eq. (1), the phase difference ϕ between rays passing through adjacent zones would be given by:

$$\phi = (N_2 t_2 - N_1 t_1)/\lambda_o. \qquad \text{Eq. (8)}$$

The lens thickness remains constant in a plano-plano lens, so that $t_1=t_2=t$. For S subdivisions per zone, their indices would be given by:

$$N_S = (2\pi\lambda_o + N_1 t)/St, \qquad \text{Eq. (9)}$$

where S=1, 2, 3 . . . For example, if the lens has a 25 mm focal length, a thickness t of 2 mm, $\lambda_o=0.587$ nm, $N_1=1.5000$ and each subzone is partitioned into four subzones, then the refractive index of each subzone is $N_S=4.6\times10^{-4}$.

Figure 11:
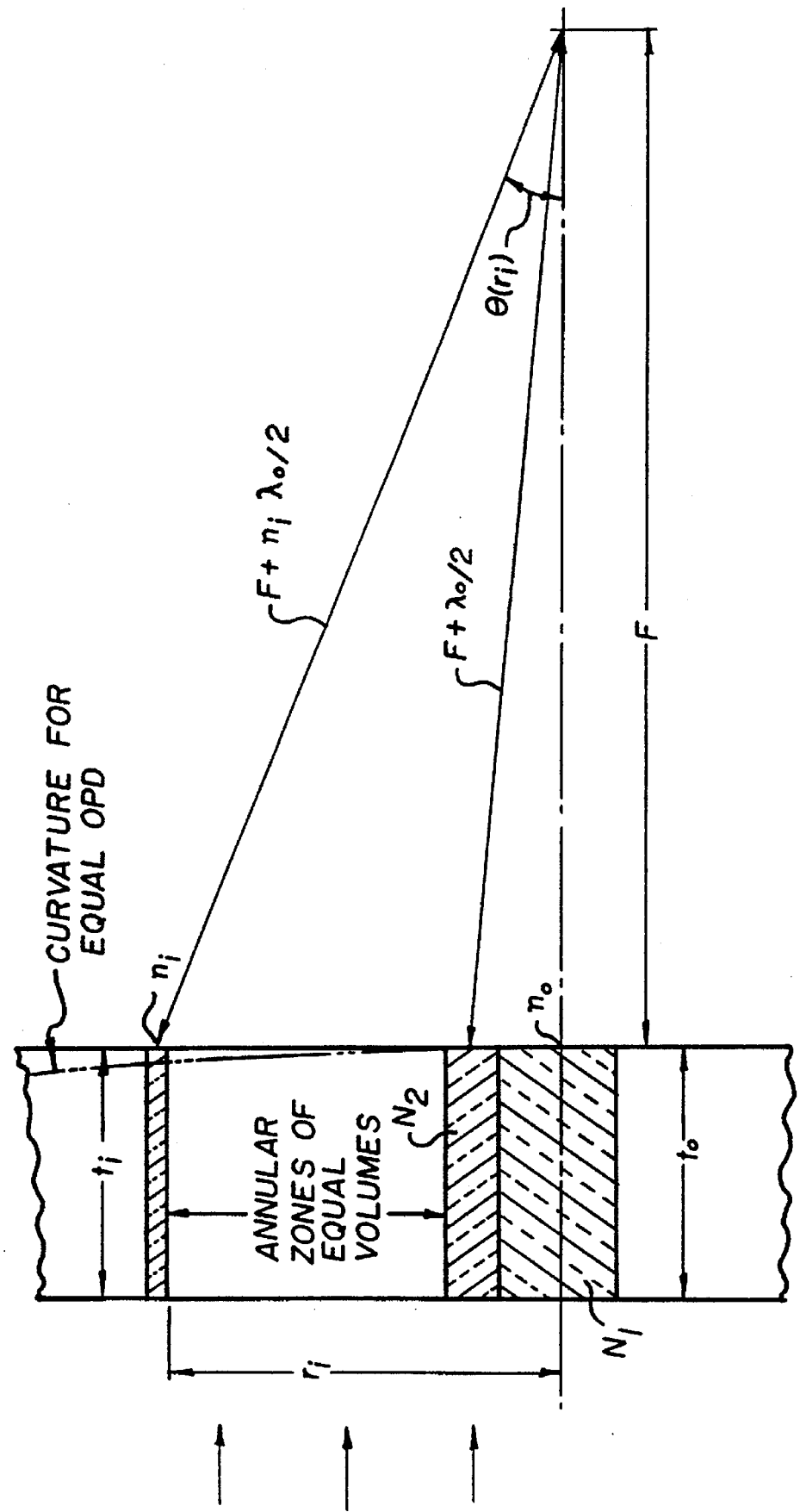
FIG. 11 shows a fragmentary sectional view of a lens according to the invention, with various ray paths indicated to the focal point.

As illustrated schematically in FIG. 11, diffracted light rays travel a longer distance to the paraxial focal point f as the zonal distance increases outward from the optical axis.

The optical path length $N_2 t_i$ of a light ray passing through an off-axis zone $n_i$ has a longer OPD by an amount $f+n_i\lambda_o/2$, compared to the optical path length $N_1 t_o$ of an axial ray.

For all rays to remain in the same phase relationship, their optical paths or OPDs should be equal even multiples of wavelength with respect to annular or radial distance from the axis of the lens to the inner diameter of the zone. Therefore, the equality $OPD_o = OPD_i$ must be satisfied. Off-axis zone lengths or axial thicknesses should be reduced by a small amount $t_i$, corresponding to their respective heights or radii $r_i$. Equating OPDs for on- and off-axis zones, each incremental axial zone length will be given by:

$$t_i = (N_1 t_o - n_i \lambda_o/2)/N_2, \qquad \text{Eq. (10)}$$

where $i = 2, 4, 6 \ldots$ By geometry, the annular distances or radial heights $r_i$ for each $t_i$ will be given by:

$$r_i = f \tan[\arc \cos \{f/(f + n_i \lambda_o/2)\}] \qquad \text{Eq. (11)}$$

The resultant surface calculated from Eqs. (10) and (11) has a parabolic shape and can be expressed by a polynomial equation. Commercially available computer programs such as MathCAD published by Mathsoft, Inc. of Cambridge, Mass. may be used to calculate $t_i$ for a gradial lens.

The inner radius of the i-th zone boundary is determined from $\Theta(r_i) = 2\pi m$, where $\Theta(r)$ is the desired phase function for the diffractive lens. For a diffractive lens with a surface relief structure comprising concentric annular zones (modulo $2\pi$), the full-periods associated with the phase function are given by:

$$\Theta(r) = (2\pi/\lambda_o) A r^2 + F r^4 + G r^6 + H r^8 = 2\pi m, \qquad \text{Eq. (12)}$$

where $A \ldots H$ are higher order aspheric coefficients of the emerging wavefront. From the polynomial curvature the focal characteristics of the gradial zone lens according to my invention can be calculated using the commercial ray tracing program OSLO published by Sinclair Optics, Inc. A generalization must be made to use OSLO to compute the focal properties; that is, the assumption is made that diffraction is localized at the back lens surface, similar to a surface-relief profile. This assumption is justified if one restricts the gradial zone lens to coaxial incident light. Otherwise, oblique light rays will be reflected and light piped within each zone. The original criteria for maintaining a $2\pi$ phase change between adjacent zones, Eq. (3), would be no longer valid under such an assumption.

The described lens comprises flat or nearly flat surfaces, as illustrated in FIGS. 3 and 4, for example. If the lens has curved surfaces such as illustrated in FIGS. 5 and 6, those skilled in the art will appreciate that there will be different saggital lengths and that the desired phase relationship will not hold. There is another aspect requiring consideration since, as mentioned previously, a diffractive lens according to my invention also can be built by sequentially spin casting and curing concentric layers comprising only one monomer, CR-39, for example. Using this method produces distinct zones that are manifested by the appearance of thin-wall separations or septa between annular rings. This effect may be the result of the liquid monomer's not being able during ultraviolet exposure to chemically cross link across the surface of the previously cured layer or zone.

A plano-convex lens constructed with layers of only one monomer exhibits an interesting combination of diffractive and refractive focusing. Such lenses can be treated as a doublet lens with a combined focal length $F(\lambda)$, by using the familiar lens equation:

$$1/F(\lambda) = 1/F_r(\lambda) + 1/F_d(\lambda), \qquad \text{Eq. (13)}$$

where $F_r$ and $F_d$ are the respective focal lengths of refractive and diffractive components. The focal length of a dispersive refractive lens is given by:

$$1/F_r(\lambda) = 1/F_{ro} - (D/F_{ro})(\lambda - \lambda_o)/(N_o - 1), \qquad \text{Eq. (14)}$$

where the dispersion coefficient $D = dN/d\lambda$. The dispersion coefficient is taken from the linear approximation of the index of refraction:

$$N(\lambda) = N_o - D(\lambda - \lambda_o). \qquad \text{Eq. (15)}$$

Concomitantly, the focal length of the diffractive element is independent of the refractive index and is given by:

$$F_d(\lambda) = F_{do} \lambda_o / \lambda. \qquad \text{Eq. (16)}$$

If the ratio of the focal length of the diffractive component to that of the refractive component is given by:

$$F_{do}/F_{ro} = (N_o - 1)/\lambda_o D, \qquad \text{Eq. (17)}$$

then the resulting focal length is given by:

$$1/F(\lambda) = 1/F_{ro} + 1/F_{do}, \qquad \text{Eq. (18)}$$

where $F_{do}$ and $F_{ro}$ are respective focal lengths at wavelength $\lambda_o$.

The resulting composite lens given by Eq. (18) has a focal length almost independent of wavelength; that is, the lens is chromatically corrected within the limits of the linear approximation. Note that each lens has a positive focal length. When functioning as an achromat, the focal length of the diffractive lens is shorter for the longer wavelengths, while the opposite is true for the refractive lens.

While my invention has been shown and described with reference to particular embodiments thereof, those skilled in the art will understand that other variations in form and detail may be made without departing from the scope and spirit of my invention.

Having thus described my invention in sufficient detail to enable those skilled in the art to make and use it, I claim as new and desire to secure Letters Patent for:

1. A method of making a diffractive lens, comprising the steps of:

providing a mold having an axis and a mold cavity symmetrically surrounding the axis, the cavity having a desired geometry for at least one exterior surface of the diffractive lens;

spinning the mold about the axis;

injecting a first volume of a first optically transparent material into the cavity during the spinning, thereby placing the first volume at a periphery of the cavity to define a radially outer zone of the diffractive lens;

curing the first volume within the outer zone to at least partially solidify the material;

injecting a second volume of a second optically transparent material into the cavity during the spinning, thereby placing the second volume against an inner periphery of the outer zone to define a first radially inner zone of the diffractive lens;

curing the second volume within the first inner zone to at least partially solidify the material; and repeating the injecting and curing steps to define and cure subsequent inner zones of the diffractive lens until the mold cavity is filled with concentric zones of cured material, the cross sectional areas of the zones and the first and second materials being chosen to produce an optical phase difference between adjacent zones of $2\pi$; and the first and second optically transparent materials defining alternate ones of the zones.

2. The method of claim 1, wherein the material is a polymer and the curing is achieved by subjecting the volumes of polymer to radiation to polymerize the monomer.

3. A method according to claim 1, wherein the cross sectional area of each zone is equal for all zones of the diffractive lens.

4. A method according to claim 1, further comprising the step of placing a previously made refractive lens in the mold cavity coaxially with the axis of the mold, whereby the zones of the diffractive lens are applied to a surface of the refractive lens.

5. A method according to claim 1, wherein the mold cavity is shaped to provide a plano/plano diffractive lens.

6. A method according to claim 1, wherein the mold cavity is shaped to provide a plano/convex diffractive lens.

7. A method according to claim 1, wherein the mold cavity is shaped to provide a plano/concave diffractive lens.

8. A diffractive lens comprising a plurality of individual, concentric annular zones of material, the zones extending from a central radially innermost zone to a concentric radially outermost zone, the cross sectional areas of the plurality of concentric annular zones and the indicies of refraction of the plurality of concentric annular zones being chosen so that first and second zones of material of said plurality of individual concentric annular zones of material have a first and second index of refraction, respectively, and other of said plurality of individual concentric annular zones of materials have alternately repeating first and second indicies of refraction to produce an optical phase difference between adjacent zones of $2\pi$; whereby the alternating zones function as a radial grating to diffract light incident upon the lens.

9. A diffractive lens according to claim 8, wherein the material is a radiation-cured polymer.

10. A diffractive lens according to claim 8, further comprising a refractive lens with the diffractive lens applied coaxially to a surface of the refractive lens.

11. A diffractive lens according to claim 8, further comprising a plano-plano element with the diffractive lens applied coaxially to a surface of the plano-plano element.

12. A diffractive lens according to claim 10, wherein the refractive lens is a convex/convex lens.

13. A diffractive lens according to claim 10, wherein the refractive lens is a plano/convex lens and the diffractive lens is applied to the plano surface.

14. A diffractive lens according to claim 10, wherein the refractive lens is a plano/convex lens and the diffractive lens is applied to the convex surface.

15. A diffractive lens according to claim 10, wherein the refractive lens is a plano/concave lens and the diffractive lens is applied to the concave surface.

16. A diffractive lens according to claim 8, wherein the lens is a plano-plano diffractive lens.

17. A diffractive lens according to claim 8, wherein the lens is a plano-convex diffractive lens.

18. A diffractive lens according to claim 8, wherein the lens is a plano-concave diffractive lens.

* * * * *